United States Patent Office 3,577,264
Patented May 4, 1971

3,577,264
SILOXANE-UNSATURATED ESTER COATED
PRODUCT
John D. Nordstrom, Detroit, Mich., assignor to Ford
Motor Company, Dearborn, Mich.
No Drawing. Filed Nov. 18, 1968, Ser. No. 776,779
Int. Cl. B44d 1/50; B41m 7/00
U.S. Cl. 117—93.31                    7 Claims

ABSTRACT OF THE DISCLOSURE

A radiation-curable, film-forming paint binder is prepared by creating a solution of vinyl monomers and an alpha-beta olefinically unsaturated siloxane formed by reacting a siloxane having at least two functional groups selected from hydroxy groups and hydrocarbonoxy groups with a hydroxyl bearing ester of an alpha-beta unsaturated carboxylic acid, e.g. hydroxy acrylates, methacrylates, cinnamates and crotonates. The preferred hydroxyl bearing esters are acrylates and methacrylates. The paint binder is applied as a liquid film to a substrate and cured thereon by an electron beam.

---

This invention relates to the art of coating and is concerned with paint and painted articles of manufacture wherein the painted surface has high resistance to weathering. This invention is particularly concerned with articles of manufacture having external surfaces of wood, metal or polymeric solid coated with an in situ formed polymerization product of a radiation-curable paint binder crosslinked on such surface by ionizing radiation and comprising a film-forming solution of vinyl monomers and an alpha-beta olefinically unsatuarted siloxane, the reaction product of one molar part siloxane having at least two hydroxyl and/or hydrocarbonoxy groups and, preferably at least two molar parts of, a hydroxyl bearing ester of an alpha-beta unsaturated carboxylic acid.

In this application, the term "paint" is meant to include pigment and/or finely ground filler, the binder without pigment and/or filler or having very little of the same, which can be tinted if desired. Thus, the binder which is ultimately converted to a durable film resistant to weathering, can be all or virtually all that is used to form the film, or it can be a vehicle for pigment and/or particulate filler material.

The siloxanes employed in the preparation of the binder have a reactive hydroxyl or hydrocarbonoxy group bonded to at least two of its silicon atoms. The term "siloxane" as employed herein refers to a compound containing a

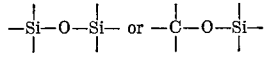

linkage, with the remaining valences being satisfied by a hydrocarbon radical, a hydrocarbonoxy group, hydrogen, a hydroxyl group, or an oxygen atom which interconnects the silicon atom providing such valence with another silicon atom.

The acyclic siloxane molecules which can be used in preparing the paint binder resins in this invention advantageously contain about 3 to about 18 silicon atoms per molecule with corresponding oxygen linkages. The preferred siloxanes are represented by the following general formula:

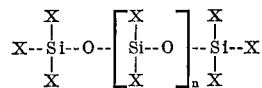

wherein $n$ is at least 1 and X is (a) a $C_1$ to $C_8$ monovalent hydrocarbon radical, preferably a $C_1$ to $C_4$ alkyl radical, or (b) $C_1$ to $C_8$ monovalent hydrocarbonoxy radical, preferably a $C_1$ to $C_4$ alkoxy radical, or (c) a hydroxyl radical, or (d) hydrogen, with at least two of the X groups separated by a

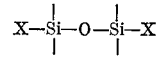

linkage being either (b) or (c).

The cyclic siloxanes which can be used in preparing the paint binder resins of this invention contain at least 3, preferably 6 to 12, and ordinarily not more than 18, silicon atoms per molecule with corresponding oxygen linkages. The cyclic polysiloxanes used may take the form of one of the following type formulas:

(I)     $X_{n'}Si_nO_{n''}$ where $n$=an odd numbered positive integer of at least 3,
$n'=2n$, and
$n''=n$
X= (a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

linkage being either (b) or (c)

Exemplified by the following formula:

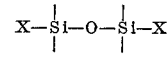

(II)     $X_{n'}Si_nO_{n''}$ where $n$=an odd numbered positive integer of at least 5,
$n'=n+3$, and
$n''=6, 6+3$ or $6+$a multiple of 3
X= (a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

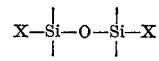

linkage being either (b) or (c).

Exemplified by the following structural formula:

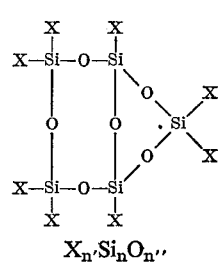

(III)     $X_{n'}Si_nO_{n''}$ where
n=6 or a multiple of 6,
n'=8, 8+6, or 8+a multiple of 6
n''=8, 8+9, or 8+a multiple of 9
X=(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

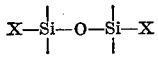

linkage being either (b) or (c).
Exemplified by the following structural formula:

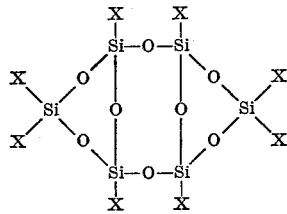

or a condensation dimer, trimer, etc., thereof formed with loss of water or alcohol.

(IV)     $X_{n'}Si_nO_{n''}$ where
n=an even numbered positive integer of at least 4,
n'=n+4, and
n''=4, 4+3, or 4+ a multiple of 3
X=(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

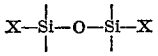

linkage being either (b) or (c).
Exemplified by the following structural formula:

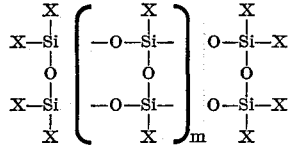

where $n$ is 0 or a positive integer.

(V)     $X_{n'}Si_nO_{n''}$ where
n= an even numbered positive integer of at least 8,
n'=n+2, and
n''=11, 11+3, or 11+a multiple of 3
X=(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

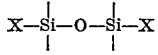

linkage being either (b) or (c).

Exemplified by the following structural formula:

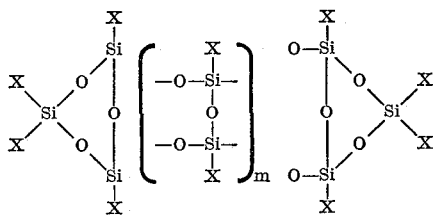

where $m$ is a positive integer.

A variety of methods are known to the art for preparing siloxanes. These include controlled hydrolysis of silanes, polymerization of a lower molecular weight siloxane, reacting silicon tetrachloride with an alcohol, etc. The preparation of siloxanes and their incorporation into organic resins is disclosed in U.S. Patents 3,154,597; 3,074,904; 3,044,980; 3,044,979; 3,015,637; 2,996,479; 2,973,287; 2,937,230; and 2,909,549.

The hydroxyl bearing ester is preferably a monohydroxy alkyl ester of an alpha-beta olefinically unsaturated monocarboxylic acid. The preferred hydroxy esters are acrylates and methacrylates in that they provide olefinic unsaturation between the terminal carbon atoms and are readily polymerizable at relatively low doses of ionizing radiation. A partial and exemplary list of such acrylates follows:

2-hydroxyethyl acrylate or methacrylate
2-hydroxypropyl acrylate or methacrylate
2-hydroxybutyl acrylate or methacrylate
2-hydroxyoctyl acrylate or methacrylate
2-hydroxydodecanyl acrylate or methacrylate
2-hydroxy--chloropropyl acrylate or methacrylate
2-hydroxy-3-acryloxypropyl acrylate or methacrylate
2-hydroxy-3-methacryloxypropyl acrylate or methacrylate
2-hydroxy-3-allyloxypropyl acrylate or methacrylate
2-hydroxy-3-cinnamylpropyl acrylate or methacrylate
2-hdroxy-3-phenoxypropyl acrylate or methacrylate
2-hydroxy-3-(o-chlorophenoxy)propyl acrylate or methacrylate
2-hydroxy-3-(p-chlorophenoxy)propyl acrylate or methacrylate
2-hydroxy-3-(2,4-dichlorophenoxy)propyl acrylate or methacrylate
2-hydroxy-3-acetoxypropyl acrylate or methacrylate
2-hydroxy-3-propionoxypropyl acrylate or methacrylate
2-hydroxy-3-chloroacetoxypropyl acrylate or methacrylate
2-hydroxy-3-dichloroacetoxypropyl acrylate or methacrylate
2-hydroxy-3-trichloroacetoxypropyl acrylate or methacrylate
2-hydroxy-3-benzoxypropyl acrylate or methacrylate
2-hydroxy-3-(o-chlorobenzoxy)propyl acrylate or methacrylate
2-hydroxy-3-(p-chlorobenzoxy)propyl acrylate or methacrylate
2-hydroxy-3-(2,4-dichlorobenzoxy)propyl acrylate or methacrylate
2-hydroxy-3-(3,4-dichlorobenzoxy)propyl acrylate or methacrylate
2-hydroxy-3-(2,4,6-trichlorophenoxy)propyl acrylate or methacrylate
2-hydroxy-3-(2,4,5-trichlorophenoxy)propyl acrylate or methacrylate
2-hydroxy-3-(o-chlorophenoxyacetoxy)propyl acrylate or methacrylate
2-hydroxy-3-phenoxyacetoxypropyl acrylate or methacrylate
2-hydroxy-3-(p-chlorophenoxyacetoxy)propyl acrylate or methacrylate
2-hydroxy-3-(2,4-dichlorophenoxyacetoxy)propyl acrylate or methacrylate 2-hydroxy-3-(2,4,5-trichlorophenoxyacetoxy)propyl acrylate or methacrylate
2-hydroxy-3-crotonoxypropyl acrylate or methacrylate
2-hydroxy-3-cinnamyloxypropyl acrylate or methacrylate
3-acryloxy-2-hydroxypropyl acrylate or methacrylate
3-allyloxy-2-hydroxypropyl acrylate or methacrylate
3-chloro-2-hdroxypropyl acrylate or methacrylate
3-crotonoxy-2-hydroxypropyl acrylate or methacrylate In addition to acrylates and methacrylates one may also use cinnamates, crotonates, etc.

The term "ionizing radiation" as employed herein means radiation having sufficient energy to effect polymerization of the paint films herein disclosed, i.e. energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitter and the workpiece where the intervening space is occupied by air. Adjustment can be made for the relative resistance of the intervening gas which is preferably an oxygen-free inert gas such as nitrogen or helium. I prefer to employ an electron beam which at its source of emission has average energy in the range of about 150,000 to about 500,000 electron volts.

The films formed from the paints of this invention are advantageously cured at relatively low temperature, e.g. between room temperature (20° to 25° C.) and the temperature at which significant vaporization of its most volatile component is initiated, ordinarily between 20° and 70° C. The radiation energy is applied at dose rates of about 0.1 to about 100 Mrad per second upon a preferably moving workpiece with the coating receiving a total dose in the range of about 0.5 to about 100, ordinarily between about 1 and about 25, and most commonly between 5 and 15 Mrad. The films can be converted by the electron beam into tenaciously bound, wear and weather resistant coatings.

The abbreviation "Mrad" as employed herein means 1,000,000 rad. The term "rad" as employed herein means that dose of radiation which results in the absorption of 100 ergs of energy per gram of absorber, e.g. coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam, which may be about ⅛ inch in diameter at this point, is then scanned to make a fan-shaped beam and then passed through a metal window, e.g. a magnesium-thorium alloy, aluminum, an alloy of aluminum and a minor amount of copper, etc., of about 0.003 inch thickness.

The term "vinyl monomers" as used herein refers to a monomeric compound having a

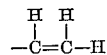

or

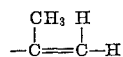

terminal group and excludes allylic compounds. The preferred vinyl monomers are esters of $C_1$ to $C_8$ monohydric alcohols and acrylic or methacrylic acid, e.g. ethyl acrylate, ethyl methacrylate, butyl acrylate, butyl methacrylate, octyl acrylate, 2-ethyl hexyl acrylate, etc. Alcohols of higher carbon number, e.g. $C_9$–$C_{15}$, can also be used to prepare such acrylates and methacrylates.

Vinyl hydrocarbon monomers, e.g. styrene and alkylated styrenes such as vinyl toluene, alpha-methyl styrene, etc., may be used separately or in combination with acrylates and methacrylates. Also in combination with acrylates and methacrylates and/or vinyl hydrocarbon monomers, there may be used minor amounts of other vinyl monomers such as nitriles, e.g. acrylonitrile, acrylamide, N-methylol acrylonitrile, vinyl halide, e.g. vinyl chloride, and vinyl carboxylates, e.g. vinyl acetate.

The film-forming material should have an application viscosity low enough to permit rapid application to the substrate in substantially even depth and high enough so that at least 1 mil (.001 inch) film will hold upon a vertical surface without sagging. Such films will ordinarily be applied to an average depth of about 0.1 to 4 mils with appropriate adjustment in viscosity and application technique. It will be obvious to those skilled in the art that the choice of siloxane and of hydroxy esters in preparing the alpha-beta olefinically unsaturated siloxane component of the binder solution can be varied so as to vary the viscosity of the siloxane component. This factor and the type and quantity of vinyl monomers in the binder solution are easily adjusted to provide a proper consistency for application by conventional paint application techniques, e.g. spraying, roll coating, etc.

The paint binder is preferably applied to the substrate and cured thereon as a continuous film of substantially even depth. The alpha-beta olefinically unsaturated siloxane-unsaturated ester product is homopolymerizable by ionizing radiation. However, for many applications, it is advantageous to apply the siloxane in solution with vinyl monomers. In this invention, the paint binder solution contains about 20 to about 90, advantageously about 30 to about 70, and preferably above about 55, weight percent of the siloxane-unsaturated ester reaction product and about 10 to about 80, advantageously about 30 to about 70, and preferably below about 45 percent of vinyl monomers. In a preferred embodiment, the vinyl monomers and said siloxane-unsaturated ester product together comprise at least about 85 weight percent of said binder. Minor amount of other polymerizable monomers, e.g., allylic compounds, may be used to make up the balance, if any.

This invention will be more fully understood from the following illustrative examples:

EXAMPLE 1

A siloxane-unsaturated ester paint is prepared from the following components in the manner hereinafter set forth:

| Reactants: | Parts by weight |
| --- | --- |
| Methoxy functional acyclic siloxane [1] | 178 |
| Hydroxyethyl methacrylate | 118 |
| Tetraisopropyl titanate | 0.32 |
| Hydroquinone | 0.06 |

[1] A commercially available methoxylated partial hydrolysate of monophenyl and phenylmethyl silanes (largely condensed dimethyltriphenyltrimethoxytrisiloxane) and has the following typical properties:

| Average molecular weight | 750–850 |
| --- | --- |
| Average number of silicon atoms per molecule | 5–6 |
| Average number of methoxy groups per molecule | 3–4 |

The siloxane, the methacrylate monomer and hydroquinone polymerization inhibitor are heated to 100° C. in a flask fitted with a Barrett type distillation receiver. The titanate catalyst is added and the temperature is raised to 150° C. over a three hour period during which time methanol is removed by distillation. The cooled reaction product has a viscosity of 0.6 stoke at 25° C. A film-forming solution is formed of 70 parts by weight of this reaction product and 30 parts by weight of an equimolar mixture of styrene and methyl methacrylate. This material is applied as a 0.7 mil film upon metal, wood and polymeric (ABS acrylonitrile-butadiene-styrene copolymer) and polymerized thereon by ionizing radiation in the form of an electron beam. The conditions of irradiation are as follows:

| | | |
|---|---|---|
| Average beam potential | kv | 275 |
| Average current | ma | 25 |
| Atmosphere | | nitrogen |
| Distance, emitter to workpiece | inches | 10 |
| Total dose | Mrad | 15-20 |

EXAMPLE 2

The procedure of Example 1 is repeated except that the polysiloxane is a methoxylated partial hydrolysate of monophenyl and phenylmethyl silanes consisting essentially of dimethyltriphenyltrimethoxytrisiloxane and has the following typical properties:

| | |
|---|---|
| Average molecular weight | 470 |
| Combining weight | 155 |
| Specific gravity at 77° F. | 1.105 |
| Viscosity at 77° F., centistokes | 13 |

EXAMPLE 3

The procedure of Example 1 is repeated except that the paint binder solution contains about 40 parts by weight of the siloxane-unsaturated ester product and about 60 parts by weight of a mixture of ethyl acrylate, butyl acrylate, vinyl toluene and styrene.

EXAMPLE 4

The procedure of Example 2 is repeated except that the paint binder solution contains about 60 parts by weight of the siloxane-unsaturated ester product and about 40 parts by weight of a vinyl monomer mixture of styrene, methyl methacrylate and 2-ethyl hexyl acrylate.

EXAMPLE 5

A siloxane-unsaturated ester coating material is prepared from the following components in the manner hereinafter set forth:

| Reactants: | Parts by weight |
|---|---|
| Hydroxy functional cyclic siloxane [1] | 200 |
| Hydroxyethyl methacrylate | 71 |
| Hydroquinone | 0.1 |
| Xylene, solvent | 116 |

[1] A commercially available hydroxy functional, cyclic, polysiloxane having the following typical properties:

| | |
|---|---|
| Hydroxy content, Dean Stark: | |
| Percent condensible | 5.5 |
| Percent free | 0.5 |
| Average molecular weight | 1600 |
| Combining weight | 400 |
| Refractive index | 1.531 to 1.539 |
| Softening point, Durran's Mercury Method, degrees F. | 200 |
| At 60% solids in xylene | |
| Specific gravity at 77° F. | 1.075 |
| Viscosity at 77° F., centipoises 33 Gardner-Holdt | A-1 |

A three neck flask fitted with a stirring motor, a thermometer, a nitrogen inlet and a Barrett trap is charged with the siloxane, the methacrylate, the xylene and the hydroquinone. This solution is heated to reflux, 138° C., over a 30 minute period. Nitrogen is bubbled into the reaction throughout the whole procedure. By-product water is slowly removed and the temperature gradually rises to 146° C. After 5 hours, 8.5 ml. of water is collected indicating nearly complete reaction. The xylene is removed by reduced pressure distillation and the product is then diluted to 70 percent non-volatile content with methyl methacrylate. The product solution is spread on a steel panel with a wire wound rod and crosslinked with an 18 Mrad dose of electrons under the same conditions as used in Example 1.

EXAMPLE 6

The procedures of Examples 1, 2 and 5 are repeated except that an equivalent amount of 2-hydroxyethyl acrylate is substituted for the hydroxyethyl methacrylate.

EXAMPLE 7

The procedures of Examples 1, 2 and 5 are repeated except that an equivalent amount of 2-hydroxypropyl methacrylate is substituted for the hydroxyethyl methacrylate.

EXAMPLE 8

The procedures of Examples 1, 2 and 5 are repeated except that an equivalent amount of 2-hydroxybutyl acrylate is substituted for the hydroxyethyl methacrylate.

EXAMPLE 9

The procedures of Examples 1, 2 and 5 are repeated except that an equivalent amount of 2-hydroxyoctyl acrylate is substituted for the hydroxyethyl methacrylate.

EXAMPLE 10

The procedures of Examples 1, 2 and 5 are repeated except that an equivalent amount of 2-hydroxydodecanyl methacrylate is substituted for the hydroxyethyl methacrylate.

EXAMPLE 11

The procedures of Examples 1, 2 and 5 are repeated except that an equivalent amount of 3-chloro-2-hydroxypropyl acrylate is substituted for the hydroxyethyl methacrylate.

EXAMPLE 12

The procedures of Examples 1, 2 and 5 are repeated except that an equivalent amount of 3-acryloxy-2-hydroxypropyl methacrylate is substituted for the hydroxyethly methacrylate.

EXAMPLE 13

The procedure of Examples 1, 2 and 5 are repeated except that an equivalent amount of 3-crotonoxy-2-hydroxypropyl acrylate is substituted for the hydroxyethyl methacrylate.

EXAMPLE 14

The procedures of Examples 1, 2 and 5 are repeated except that an equivalent amount of 3-acryloxy-2-hydroxypropyl cinnamate is substituted for the hydroxyethyl methacrylate.

EXAMPLE 15

The procedures of Examples 1, 2 and 5 are repeated except that an equivalent amount of 3-acryloxy-2-hydroxypropyl crotonate is substituted for the hydroxyethyl methacrylate.

EXAMPLE 16

The procedure of Example 1 is repeated except that the reactants are proportioned to provide in the reaction mix 412 parts by weight of the polysiloxane, 195 parts by weight of hydroxyethyl methacrylate and 0.2 part by weight of hydroquinone.

EXAMPLE 17

The procedure of Example 1 is repeated except that the reactants are proportioned to provide in the reaction mix 206 parts by weight of the polysiloxane, 65 parts by weight of hydroxyethyl methacrylate and 0.1 part by weight of hydroquinone.

EXAMPLE 18

The procedure of Example 1 is repeated except that the polysiloxane employed in dimethyltriphenyltrimethoxytrisiloxane.

EXAMPLE 19

The procedure of Example 1 is repeated except that the polysiloxane employed is dipropoxytetramethylcyclotrisiloxane.

EXAMPLE 20

The procedure of Example 1 is repeated except that the polysiloxane employed in dibutoxytetramethyldisiloxane.

EXAMPLE 21

The procedure of Example 1 is repeated except that the polysiloxane employed is dibutoxytetramethylditrisiloxane.

EXAMPLE 22

A pigmented paint is prepared by premixing 75 parts by weight of the siloxane-unsaturated ester product of Example 5 with 150 parts by weight of commercial grade titanium dioxide pigment and 20 parts by weight of methyl methacrylate. The mixture is ground by shaking with an equal amount of glass beads in a conventional paint shaker for 30 minutes. The premix is diluted with an additional 75 parts by weight of the siloxane-unsaturated ester product and 65 parts by weight of the resultant mix are diluted with 35 parts by weight of an equimolar mixture of styrene and methyl methacrylate. The paint is applied to a metal panel to an average depth of about 1.5 mils and cured thereon with a 20 Mrad dose of 295 kv., 25 ma. electron beam in a nitrogen atmosphere.

EXAMPLE 23

The procedure of Example 22 is repeated with a film of about 0.5 mil average thickness upon a wood substrate using beam potentials of 175,000 volts at 6 inches and with a beam potential of 400,000 volts at 10 inches in nitrogen containing minor amounts of carbon dioxide.

EXAMPLE 24

The procedure of Examples 1 and 5 are repeated except that a film of about 0.7 mil average thickness is applied upon a metal substrate, said film being formed from a solution containing about 25 parts by weight of the siloxane-unsaturated ester product, about 65 parts by weight of an equimolar mixture of styrene and methyl methacrylate and about 15 parts by weight pigment.

EXAMPLE 25

The procedure of Examples 1 and 5 are repeated except that a film of about 0.7 mil average thickness is applied upon a metal substrate, said film being formed from a solution containing about 65 parts by weight of the siloxane-unsaturated ester product, about 20 parts by weight of an equimolar mixture of styrene and methyl methacrylate and about 15 parts by weight pigment.

It will be understood by those skilled in the art that modifications can be made within the foregoing examples within the scope of the invention as hereinafter claimed.

What is claimed is:

1. An article of manufacture comprising in combination a substrate and a coating adhered thereto and comprising the polymerization product of a film-forming dispersion cross-linked in situ by ionizing radiation, said film-formng dispersion on a pigment and particulate filler-free basis consisting essentially of (1) vinyl monomers and (2) an alpha-beta olefinically unsaturated siloxane formed by reacting a siloxane containing about 3 to about 18 silicon atoms per molecule and having at least two functional groups selected from hydroxy groups and hydrocarbonoxy groups with a monohydroxy alkyl ester of an alpha-beta olefinically unsaturated monocarboxylic acid.

2. An article of manufacture comprising in combination a substrate and a coating adhered thereto and comprising the polymerization product of a film-forming dispersion cross-linked in situ by ionizing radiation, said film-forming dispersion on a pigment and particulate filler-free basis consisting essentially of (1) about 10 to about 80 weight percent vinyl monomers at least a major proportion of which are selected from esters of acrylic or methacrylic acid and a $C_1$–$C_8$ monohydric alcohol and $C_8$–$C_9$ monovinyl hydrocarbons, and (2) about 10 to about 90 weight percent of an alpha-beta olefinically unsaturated siloxane formed by reacting a siloxane containing about 3 to about 18 silicon atoms per molecule and having at least two functional groups selected from hydroxy groups and $C_1$–$C_4$ alkoxy groups with a monohydroxy alkyl ester of an alpha-beta olefinically unsaturated monocarboxylic acid.

3. An article of manufacture in accordance with claim 2 wherein said monohydroxy ester is an acrylate or methacrylate.

4. An article of manufacture in accordance with claim 2 wherein said monohydroxy ester is a cinnamate.

5. An article of manufacture in accordance with claim 2 wherein said monohydroxy ester is a crotonate.

6. An article of manufacture in accordance with claim 2 wherein said siloxane contains about 3 to about 12 silicon atoms.

7. An article of manufacture comprising in combination a substrate and a coating having average depth in the range of about 0.1 to about 4 mils adhered thereto and comprising the polymerization product of a film-forming dispersion crosslinked in situ by ionizing radiaton, said film-formng dispersion on a pigment and particulate filler-free bass consisting essentially of (1) about 30 to about 70 weight percent vinyl monomers at least a major proportion of which are selected from esters of acrylic or methacrylic acid and a $C_1$–$C_8$ monohydric alcohol and $C_8$–$C_9$ monovinyl hydrocarbons, and (2) about 70 to about 30 weight percent of an alpha-beta olefinically unsaturated siloxane formed by reacting a siloxane containing about 3 to about 18 silicon atoms per molecule and having at least two functional groups selected from hydroxy groups and methoxy groups with a monohydroxy ester of acrylic or methacrylic acid and a $C_2$–$C_3$ diol, the remaining valences of said silicon atoms being satisfied with hydrocarbon radical, oxygen, hydrocarbonoxy radical, hydrogen or hydroxyl.

References Cited

UNITED STATES PATENTS

| 3,437,512 | 4/1969 | Burlant et al. | 117—93.31 |
| 3,437,513 | 4/1969 | Burlant et al. | 260—827X |
| 3,488,304 | 1/1970 | Baugh et al. | 260—22 |

ALFRED L. LEAVITT, Primary Examiner

E. G. WHITBY, Assistant Examiner

U.S. Cl. X.R.

117—127, 132, 138.8, 147, 161; 260—41, 827